US011521022B2

(12) United States Patent
Brewington et al.

(10) Patent No.: US 11,521,022 B2
(45) Date of Patent: Dec. 6, 2022

(54) SEMANTIC STATE BASED SENSOR TRACKING AND UPDATING

(71) Applicant: Google LLC, Mountain View, CA (US)

(72) Inventors: Brian Brewington, Superior, CO (US); Zhiyuan Weng, Superior, CO (US); Yan Mayster, Aurora, CO (US); Brian Shucker, Superior, CO (US); Sujoy Banerjee, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 243 days.

(21) Appl. No.: 16/629,856

(22) PCT Filed: Nov. 7, 2017

(86) PCT No.: PCT/US2017/060295
§ 371 (c)(1),
(2) Date: Jan. 9, 2020

(87) PCT Pub. No.: WO2019/093993
PCT Pub. Date: May 16, 2019

(65) Prior Publication Data
US 2021/0027112 A1 Jan. 28, 2021

(51) Int. Cl.
*G06K 9/62* (2022.01)
*G06N 20/00* (2019.01)
(Continued)

(52) U.S. Cl.
CPC .......... *G06K 9/6265* (2013.01); *G06N 20/00* (2019.01); *G06V 10/22* (2022.01); *G06V 10/462* (2022.01); *H04Q 9/00* (2013.01)

(58) Field of Classification Search
CPC .......... G06K 9/62; G06K 9/20; G06K 9/6265; G06K 9/4671; G06K 9/2054; G06N 20/00; H04Q 9/00
(Continued)

(56) References Cited

U.S. PATENT DOCUMENTS 5,477,451 A * 12/1995 Brown ..................... G06F 40/49
704/9
6,711,278 B1 * 3/2004 Gu .......................... G06T 7/215
375/E7.193
(Continued)

OTHER PUBLICATIONS

Abdelnasser et al, "SemanticSLAM: Using Environment Landmarks for Unsupervised Indoor Localization", Transactions on Mobile Computing, Sep. 2015, 13 pages.
(Continued)

*Primary Examiner* — Congvan Tran
(74) *Attorney, Agent, or Firm* — Dority & Manning, P.A.

(57) ABSTRACT

Provided are methods, systems, and devices for updating a sensor based on sensor data and the semantic state associated with an area. Sensor data can be received by a computing system. The sensor data can be based on sensor outputs from sensors. The sensor data can include information associated with states of areas detected by the sensors. An estimated semantic state of one of the areas from a target sensor that can detect the states of the areas can be generated. Based on a comparison of the estimated semantic state to semantic states of the area from the sensors, an uncertainty level associated with an accuracy of the estimated semantic state can be determined. In response to the uncertainty level satisfying one or more update criteria, an updated version of the sensor data from the target sensor can be obtained.

20 Claims, 8 Drawing Sheets

(51) Int. Cl.
*H04Q 9/00* (2006.01)
*G06V 10/22* (2022.01)
*G06V 10/46* (2022.01)

(58) Field of Classification Search
USPC ............................................................ 382/159
See application file for complete search history.

(56) References Cited

U.S. PATENT DOCUMENTS

| | | | | |
|---|---|---|---|---|
| 10,045,321 | B2* | 8/2018 | Goldstein | H04W 64/00 |
| 10,372,130 | B1* | 8/2019 | Kaushansky | B60W 50/14 |
| 11,119,477 | B1* | 9/2021 | Konrardy | B60R 25/255 |
| 2012/0036093 | A1* | 2/2012 | Gleason | G06N 20/00 |
| | | | | 706/12 |
| 2014/0214397 | A1* | 7/2014 | Dymetman | G06F 40/40 |
| | | | | 704/2 |
| 2015/0379774 | A1* | 12/2015 | Trainor | G06T 19/006 |
| | | | | 345/633 |
| 2017/0031996 | A1* | 2/2017 | Priness | G06F 16/24575 |
| 2018/0053102 | A1* | 2/2018 | Martinson | G08G 1/09623 |
| 2018/0143975 | A1* | 5/2018 | Casal | G06F 40/51 |
| 2018/0307921 | A1* | 10/2018 | Vallespi-Gonzalez | G01S 17/931 |
| 2019/0035101 | A1* | 1/2019 | Kwant | G06V 20/588 |
| 2019/0122046 | A1* | 4/2019 | Wantland | G06N 20/00 |

OTHER PUBLICATIONS

Murali et al, "Utilizing Semantic Visual Landmarks for Precise Vehicle Navigation", arXiv:1801v1, Jan. 2, 2018, 8 pages.
Search Report for PCT/US2017/060295 dated Jul. 13, 2018, 2 pages.
Vaisenberg et al, "Exploiting Semantics for Scheduling Real-Time Data Collection from Sensors to Maximize Event Detection", Electronic Imaging, vol. 7252, 13 pages.
Vaisenberg et al, "Scheduling Sensors for Monitoring Sentient Spaces Using an Approximate POMDP Policy", Pervasive and Mobile Computing, 2013, 21 pages.
International Preliminary Report on Patentability for Application No. PCT/US2017/060295, dated May 22, 2020, 10 pages.

* cited by examiner

SEMANTIC STATE BASED SENSOR TRACKING AND UPDATING

PRIORITY CLAIM

This application is based upon and claims the right of priority under 35 U.S.C. § 371 to International Application No. PCT/US2017/060295 filed on Nov. 7, 2017, which is incorporated by reference herein.

FIELD

The present disclosure relates generally to updating a sensor based on sensor data and the semantic state associated with an area.

BACKGROUND

Object detection systems can capture a variety of information about the objects in an environment, including, for example the appearance of the objects. Associating aspects of a detected object (e.g., the appearance of the object) with another piece of information such as the type of object can be useful in various applications. However, many existing object detection systems require a great deal of manual analysis and input, which can be burdensome. Further, many of the existing systems used to analyze areas are either wasteful of resources due to excessive updating of areas that have not changed or inaccurate due to not providing an up to date representation of the areas. Accordingly, there exists a demand for an effective way to update information associated with the state of an environment.

SUMMARY

Aspects and advantages of embodiments of the present disclosure will be set forth in part in the following description, or may be learned from the description, or may be learned through practice of the embodiments.

One example aspect of the present disclosure is directed to a method of updating a sensor based on sensor data and the semantic state associated with an area. The method can include receiving, by a computing system that includes one or more computing devices, sensor data based in part on one or more sensor outputs from one or more sensors. The sensor data can include information associated with one or more states of one or more areas detected by the one or more sensors. The method can include generating, by the computing system, based in part on the sensor data, an estimated semantic state of an area of the one or more areas from a target sensor that can detect the one or more states of the one or more areas. The method can include determining, by the computing system, based in part on a comparison of the estimated semantic state to one or more semantic states of the area from the one or more sensors, an uncertainty level associated with an accuracy of the estimated semantic state. Further, the method can include, responsive to the uncertainty level satisfying one or more update criteria, obtaining, by the computing system, an updated version of the sensor data from the target sensor.

Another example aspect of the present disclosure is directed to one or more tangible, non-transitory computer-readable media storing computer-readable instructions that when executed by one or more processors cause the one or more processors to perform operations. The operations can include receiving sensor data based in part on one or more sensor outputs from one or more sensors. The sensor data can include information associated with one or more states of one or more areas detected by the one or more sensors. The operations can include generating, based in part on the sensor data, an estimated semantic state of an area of the one or more areas from a target sensor that can detect the one or more states of the one or more areas. The operations can include determining, based in part on a comparison of the estimated semantic state to one or more semantic states of the area from the one or more sensors, an uncertainty level associated with an accuracy of the estimated semantic state. Further, the operations can include, responsive to the uncertainty level satisfying one or more update criteria, obtaining an updated version of the sensor data from the target sensor.

Another example aspect of the present disclosure is directed to a computing system comprising one or more processors, and one or more non-transitory computer-readable media storing instructions that when executed by the one or more processors cause the one or more processors to perform operations. The operations can include receiving sensor data based in part on one or more sensor outputs from one or more sensors. The sensor data can include information associated with one or more states of one or more areas detected by the one or more sensors. The operations can include generating, based in part on the sensor data, an estimated semantic state of an area of the one or more areas from a target sensor that can detect the one or more states of the one or more areas. The operations can include determining, based in part on a comparison of the estimated semantic state to one or more semantic states of the area from the one or more sensors, an uncertainty level associated with an accuracy of the estimated semantic state. Further, the operations can include, responsive to the uncertainty level satisfying one or more update criteria, obtaining an updated version of the sensor data from the target sensor.

Other example aspects of the present disclosure are directed to other computer-implemented methods, systems, apparatus, tangible, non-transitory computer-readable media, user interfaces, memory devices, and electronic devices for updating a sensor based on sensor data and the semantic state associated with an area.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
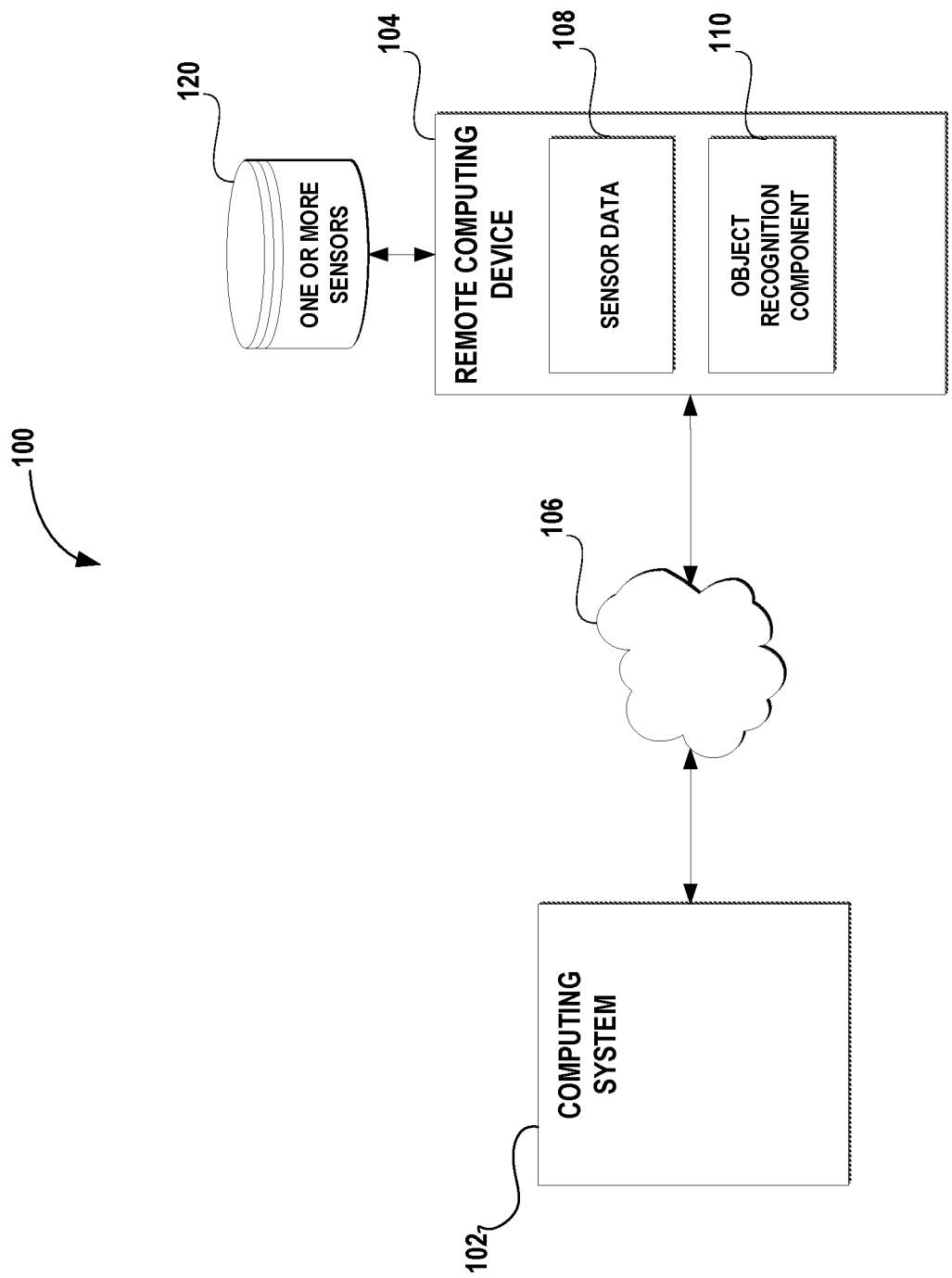
FIG. 1 depicts a diagram of an example system according to example embodiments of the present disclosure.

Example aspects of the present disclosure are directed to the determination of when to obtain updated sensor data for an area from a sensor based on more recent sensor data for the area provided by one or more other sensors. The disclosed technology can include receiving sensor data that is associated with the state of a target area (e.g., an outdoor area or other geographic area), determining based in part on the sensor data and, in some implementations, a machine learned model, an estimated semantic state of the target area, determining an uncertainty level (e.g., an indication of the level of uncertainty that the sensor data is accurate) based on a comparison of the estimated semantic state of the target area to semantic states of the area determined based on outputs from other sensors, and/or obtaining an updated version of the sensor data when the uncertainty level satisfies one or more uncertainty criteria (e.g., exceeding an uncertainty threshold level).

As such, the disclosed technology can enable more efficient acquisition, from a particular sensor, of sensor data for an area by causing data to be reacquired only when it is likely to be necessary, for instance, because it has been determined, based on data from other sensors, that the area is likely to have changed since the previous acquisition of sensor data by the particular sensor. By acquiring updated sensor data only when it is likely to be necessary, computational resources required to transmit, process and store sensor data may be used more efficiently. In addition, the load on the hardware at the sensor may be reduced. Also, the disclosed technology can more effectively estimate the semantic state associated with a sensor and provide more efficient utilization of computational power and sensor resources through use of sensor data from different sensors used to detect an area.

By way of example, the disclosed technology can include a computing system that exchanges (sends and/or receives) data or information with one or more sensors. The one or more sensors can generate sensor outputs (e.g., photographic images) that are based on one or more areas (e.g., geographic areas) that are detected by the one or more sensors. The one or more sensors can include a variety of sensors that capture various aspects and/or perspectives of the one or more areas at different sensor resolution levels. As obtaining and processing data from a higher resolution sensor can require a greater amount of resource utilization in comparison to a lower resolution sensor, the resource utilization required to obtain sensor data from the one or more sensors can be made more efficient by obtaining sensor data from higher resolution sensors less frequently than lower resolution sensors. The disclosed technology can provide an improved way to obtain sensor data by determining an uncertainty level for sensor data obtained previously using a high resolution sensor, and selectively obtaining updated sensor data from the high resolution sensor when the uncertainty level exceeds an uncertainty level threshold.

In some embodiments, the disclosed technology can include a computing system (e.g., a semantic state system) that can include one or more computing devices (e.g., devices with one or more computer processors and a memory that can store one or more instructions) that can exchange (send and/or receive), process, generate, and/or modify data including one or more information patterns or structures that can be stored on one or more memory devices (e.g., random access memory) and/or storage devices (e.g., a hard disk drive and/or a solid state drive); and/or one or more signals (e.g., electronic signals). The data and/or one or more signals can be exchanged by the computing system with various other devices including remote computing devices that can provide data associated with, or including, a semantic state associated with one or more states of an area (e.g., the amount of roads and buildings in an area); and/or one or more sensor devices that can provide sensor output associated with the state of a geographical area (e.g., satellite imagery at various sensor resolutions) that can be used to determine the state of an area.

The semantic state system can receive sensor data that is based in part on one or more sensor outputs from one or more sensors. The sensor data can include information associated with one or more states of one or more areas (e.g., geographical areas) detected by the one or more sensors. In some embodiments, the one or more sensors can include one or more optical sensors (e.g., one or more cameras), one or more acoustic sensors (e.g., one or more sonar devices), one or more infrared sensors, one or more electromagnetic sensors, one or more radiofrequency signal sensors (e.g., one or more devices that can detect the presence and/or strength of radio waves), or one or more thermal sensors.

The one or more sensors can be configured to detect the state (e.g., a physical state) of the one or more areas including one or more properties or characteristics of the one or more areas. Further, the semantic state system can access a chronometer (e.g., a locally based chronometer or a chronometer at a remote location) that can be used to determine a time of day and/or a duration of one or more events including one or more sensor events associated with detecting the state of the one or more areas, obtaining sensor data from the one or more sensors, and/or the state of the one or more areas at one or more time periods. The one or more properties or characteristics of the one or more areas can include a time of day, a geographic location (e.g., a latitude and longitude associated with the environment), a size (e.g., a height, length, and/or width), mass, weight, volume, color, frequency of one or more signals, magnitude of one or more signals, and/or sound emanations from the one or more areas.

The semantic state system can generate, based in part on the sensor data, an estimated semantic state of an area of the one or more areas from a target sensor of the one or more sensors from which the sensor data has not been received for a predetermined period of time. The duration of the predetermined period of time can vary (e.g., a week long, a day long, or an hour long period of time) based on the purpose for which the semantic state of the area is used (e.g., live traffic reports in an urban environment can have a shorter predetermined period of time before generating the estimated semantic state than a survey of a remote wilderness area).

In some embodiments, the target sensor is configured to detect the state of the one or more areas at a resolution that is higher than a resolution associated with the one or more sensors. For example, the one or more sensors can be located on a satellite that captures images from low orbit and is able to resolve images at a resolution of thirty meters per pixel, and the target sensor can include one or more ground based sensors (e.g., closed circuit cameras) that resolve images at a resolution of 1 millimeter per pixel.

In some embodiments, the semantic state system can access a machine learned model (e.g., a machine learned model that has been stored locally and/or a machine learned model that is stored on a remote computing device) that is based in part on a training dataset associated with a plurality of classified image labels and classified image features of one or more images. Further, the estimated semantic state and/or the one or more semantic states can include an embedding vector that is received from the machine learned model in response to input of the sensor data into the machine learned model. As such, the generation of the estimated semantic data can be based in part on accessing the machine learned model.

The machine learned model can be generated using a classification dataset including classifier data that includes a set of classified features and a set of classified object labels associated with training data that is based on, or associated with, a plurality of training inputs used to train the machine learned model to achieve a desired output (e.g., detecting one or more objects, such as buildings or waterways, in a satellite image). The classification dataset can be based in part on inputs to one or more sensors (e.g., visual inputs to cameras on satellites and/or at ground level) that have been used to generate one or more sensor outputs. For example, the machine learned model can be created using a set of cameras that capture training data including still images and video from one or more geographic areas over a period of time. The geographic areas can include various objects including buildings (e.g., houses and/or apartment buildings), streets, vehicles, people, waterbodies, and/or waterways.

In some embodiments, the machine learned model can be based in part on one or more classification techniques including a neural network, linear regression, logistic regression, random forest classification, boosted forest classification, gradient boosting, a support vector machine, or a decision tree. The semantic state system can use various techniques to estimate the semantic state of an area, either in combination with the machine learned model or without the machine learned model. For example, the semantic state system can use one or more techniques including Kalman filtering, Bayesian inference, Hidden Markov models, one or more genetic algorithms, edge matching, greyscale matching, gradient matching, and/or pose clustering.

The one or more semantic states can include a set of attributes (e.g., a set of attributes for each of the one or more semantic states). In some embodiments, the estimated semantic state and the one or more semantic states can include a set of attributes associated with the one or more states of the area from the target sensor and the one or more sensors not including the target sensor respectively. For example, the set of attributes can include a building concentration (e.g., the number of buildings, including houses, apartment buildings, and/or office buildings within an area); a road concentration (e.g., the amount of streets, roads, and/or paths within an area), a waterbody concentration, a forest concentration (e.g., the amount of an area that includes one or more trees or other foliage), or a vehicle concentration (e.g., the number of vehicles, including one or more automobiles, buses, trains that are in an area).

The semantic state system can determine an uncertainty level associated with an accuracy of the data previously-obtained using the target sensor. The uncertainty level can include a probability that the estimated semantic state is the same as an updated semantic state of the area based on the updated version of the sensor data from the target sensor. For example, the uncertainty level can indicate a probability that the estimated semantic state is an accurate reflection of the actual state of the area (e.g., the actual state of the area at the time the estimated semantic state was generated) as would be indicated by the updated version of the sensor data from the target sensor. Further, the uncertainty level can be based in part on a comparison of the estimated semantic state to one or more semantic states of the area from the one or more sensors not including the target sensor. For example, the comparison of the estimated semantic state to one or more semantic states can include a comparison of the types or number of semantic state attributes, which can be weighted according to their significance or importance.

In response to the uncertainty level satisfying one or more update criteria, the semantic state system can obtain an updated version of the sensor data from the target sensor. For example, the one or more update criteria can include the uncertainty level exceeding a threshold uncertainty level (e.g., the uncertainty level is greater than fifty percent). In this way, the sensor data can be updated more frequently through use of a lower threshold uncertainty level and less frequently through use of a higher threshold uncertainty level. Obtaining, an updated version of the sensor data from the target sensor can include sending one or more signals to the target sensor or a computing device associated with the target sensor. The one or more signals can include a request for the updated version of the sensor data.

The semantic state system can determine one or more characteristics of the one or more sensors. The one or more characteristics can include a type of the one or more sensors (e.g., optical sensors and/or thermal sensors), a resolution of the one or more sensors, or a sampling rate of the one or more sensors (e.g., the frequency with which the one or more sensors detect an area, generate sensor outputs, and/or send sensor data). With respect to the resolution of the one or more sensors, the semantic state system can determine one or more sensor resolutions of the one or more sensors (e.g., accessing sensor type data including the sensor resolution for a sensor). The one or more sensor resolutions can be based in part on an amount of change in the one or more states of the one or more areas that the one or more sensors are able to detect (i.e., sensors with a greater resolution can detect a smaller amount of change in the one or more states of an area). In some embodiments, the uncertainty level determined for the most recent data provided by the target sensor may be dependent on the sensor resolutions of the one or more sensors not including the target sensor. For instance, the uncertainty level can be inversely proportional to the one or more sensor resolutions of the one or more sensors not including the target sensor.

The semantic state system can determine a set of the attributes that is based in part on a similarity of the one or more characteristics between the target sensor and the one or more sensors not including the target sensor. In some embodiments, the comparison of the estimated semantic state to the one or more semantic states can be based in part on the set of attributes (e.g., comparing the set of attributes in the estimated semantic state to the set of attributes in the one or more semantic states). In some embodiments, the semantic state system can determine a semantic relatedness level for the sensor data received from the one or more sensors. The semantic relatedness level can be based in part on how many of the set of attributes in the estimated semantic state are in the one or more semantic states of the area from the one or more sensors not including the target sensor. In some embodiments, the uncertainty level can be based in part on the semantic relatedness level (e.g., the semantic relatedness level can be used as a factor in determining the uncertainty level).

In some embodiments, the semantic state system can modify the machine learned model based in part on training data that includes one or more error rates or one or more uncertainty levels associated with the one or more sensors over a plurality of time periods. In this way, the machine learned model can adapt over time based on actual sensor data that is received and feedback based on whether the output was correct.

The semantic state system can determine a state change rate that is based in part on an amount of one or more changes in the one or more semantic states of the area over a plurality of time periods. For example, an area that is transformed, in a short period of time, from wilderness into a heavily populated urban zone, will have a very high state change rate. In some embodiments, the uncertainty level associated with the target sensor can be based in part on the state change rate (e.g., a greater state change rate can correspond to a greater uncertainty level).

The semantic state system can determine an adjacent semantic state based in part on one or more semantic states of the one or more areas that are adjacent to the area. Further, the semantic state system can determine one or more differences between the estimated semantic state of the area and the adjacent semantic state. The uncertainty level can be based in part on an extent of the one or more differences between the estimated semantic state and the adjacent semantic state (e.g., a greater difference between the semantic state and the adjacent semantic state can correspond to a greater uncertainty level).

The semantic state system can determine a staleness level for the target sensor. The staleness level can be based in part on the duration since the sensor data was most recently received from the target sensor (i.e., the staleness level increases the longer time that passes between receiving sensor data from a sensor). The staleness level can be based in part on an expectation of the rate at which sensor data from a sensor is received. For example, a sensor that provides traffic updates on a stretch of highway may have a very high staleness level after thirty minutes, whereas a sensor that provides moose migration updates may have a low staleness level if a sensor update is provided on a daily basis. In some embodiments, the uncertainty level can be based in part on the staleness level (e.g., the uncertainty level will increase as the staleness level increases).

An example embodiment of the present disclosure is directed to a computer-implemented method of determining when to obtain updated sensor data. The method can include receiving, by a computing system comprising one or more computing devices, sensor data corresponding to an area. The sensor data can be derived at least in part from one or more sensor outputs from one or more sensors. Further, the method can include determining, by the computing system, based at least in part on the sensor data, a first semantic state of the area. The method can include determining, by the computing system, based in part on a comparison of the first semantic state to a second semantic state of the area, in which the second semantic state can be generated based on target sensor data derived from a sensor output of a target sensor, an uncertainty level indicative of an accuracy of the target sensor data. Further, the method can include, responsive to the uncertainty level satisfying one or more update criteria, obtaining, by the computing system, an updated version of the target sensor data from the target sensor.

In some embodiments, the sensor data and the target sensor data can both be representative of one or more states of the area. Further, the target sensor data can represent the one or more states of the area at a higher resolution than does the sensor data.

In some embodiments, the sensor data can be more recently obtained than the target sensor data. In some embodiments, the first and second semantic states can define respective locations within semantic state space.

The systems, methods, devices, and non-transitory computer-readable media in the disclosed technology can provide a variety of technical effects and benefits to the overall process of generating an estimated semantic state for an area based on sensor outputs and determining whether the semantic state for the area should be updated. The disclosed technology can reduce or eliminate the need for manual collection of information from the sensors associated with an area. In contrast with manual examination, analysis, and selection of sensor output (e.g., visual inspection of imagery from one or more satellites) to determine when to update imagery for an area, the disclosed technology can identify one or more sensors for which updated imagery should be retrieved based on the imagery received from other sensors that collect sensor imagery for an area.

Further, the disclosed technology can, by receiving sensor outputs from one or more sensors that use fewer resources (e.g., less network bandwidth to send sensor outputs for lower resolution images and/or lower computational resource utilization to generate and process lower resolution images), allow higher resolution images to be captured, processed, and sent at a more optimal frequency (e.g., when changes occur as opposed to being captured on a fixed schedule regardless of whether or not changes to the semantic state of the area have occurred). In addition, physical resources associated with obtaining the updated sensor data (e.g. fuel/energy used by a vehicle which is tasked with collecting street view images) may also be utilized more efficiently.

As the disclosed technology can estimate a semantic state for an area, the number of sensors from which sensor outputs are gathered can be reduced. Accordingly, in a system that includes a combination of various types of sensors that return different types of sensor outputs, at different resource utilization costs (e.g., utilization of processing resources, network resources, and/or expenses), lower resource utilization sensors can be more intensively used without necessarily having to sacrifice up to date sensor outputs.

The disclosed technology also offers the benefits of the semantic state for an area that can be based on sensor outputs from various different types of sensors (e.g., a combination of cameras and radio frequency sensors) that capture different types of sensor outputs that nonetheless can be used to capture similar attributes for the semantic state of an area. For example, the disclosed technology can capture one or more cellular signals that result from cell phone usage in an area. Based on the one or more cellular signals, the disclosed technology can generate a semantic state of an area based on the frequency and type of the one or more cellular signals (e.g., the type and frequency of cellular emissions in an area can denote the existence of a cell tower or the presence of cell phones that can indicate the area is populated).

Accordingly, the disclosed technology provides more effective generation of an estimated semantic state of an area based in part on one or more sensors outputs, including a combination of different sensor types at various resolutions. The disclosed technology can estimate an uncertainty level associated with the sensors to determine when to update the sensor outputs in a more effective manner than merely receiving sensor outputs at a fixed rate or by manually determining that sensor outputs are needed.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

With reference now to the FIGS. 1-9, example aspects of the present disclosure will be disclosed in greater detail. FIG. 1 depicts a diagram of an example system 100 according to example embodiments of the present disclosure. The system 100 can include a computing system 102; a remote computing device 104; a communication network 106; an object recognition component 110; sensor data 108 (e.g., data associated with one or more physical objects, one or more areas, and/or one or more semantic states); and one or more sensors 120.

The computing system 102 can receive sensor data (e.g., information associated with one or more objects detected or recognized one or more sensors associated with the remote computing device 104) from the remote computing device 104 via a communication network 106. The network 106 can include any type of communications network, such as a local area network (e.g. intranet), wide area network (e.g. Internet), cellular network, or some combination thereof. The network 106 can also include a direct connection. In general, communication can be carried via network 106 using any type of wired and/or wireless connection, using a variety of communication protocols (e.g. TCP/IP, HTTP, SMTP, FTP), encodings or formats (e.g. HTML or XML), and/or protection schemes (e.g. VPN, secure HTTP, or SSL).

The computing system 102 can include one or more computing devices including a tablet computing device, a device that is able to be worn (e.g., a smart watch or a smart band), a laptop computing device, a desktop computing device, a mobile computing device (e.g., a smartphone), and/or a display device with one or more processors.

The object recognition component 110, which can operate or be executed on the remote computing device 104, can interact with the computing system 102 via the network 106 to perform one or more operations including detection and/or determination of one or more states of one or more areas; and/or generation of an estimated semantic state of an area. In some embodiments, the object recognition component 110 can include a machine learned model that can be used to detect and/or recognize objects in an area and which can also be used in the generation of one or more semantic states including an estimated semantic state of an area.

The object recognition component 110 can be implemented on the remote computing device 104. The object recognition component 110 can implement object detection and/or recognition of one or more objects in one or more areas. Further, the object recognition component 110 can assist in the generation of one or more semantic states based on one or more sensory outputs from the one or more sensors 120. The sensory outputs can be associated with one or more images, electrical signals, sounds, or other detectable states associated with one or more objects in one or more areas and can be used to generate the sensor data 108 by the remote computing system 104.

The object recognition component 110 can be operated or executed locally on the remote computing device 104, through a web application accessed via a web browser implemented on the computing system 102, or through a combination of remote execution or operation on computing system 102 and local execution or operation on a remote computing device which can include the remote computing device 104.

In some embodiments, the remote computing device 104 can include one or more computing devices including servers (e.g., web servers). The one or more computing devices can include one or more processors and one or more memory devices. The one or more memory devices can store computer-readable instruction to implement, for example, one or more applications that are associated with the sensor data 108.

The one or more sensors 120 include one or more sensors (e.g., optical sensors, audio sensors, and/or radio wave frequency sensors) that can detect the state of geographic areas that can be associated with sets of geographic coordinates (e.g., latitude and longitude). The sensor data 108 associated with the sensor outputs from the one or more sensors 120 can include map data, image data, geographic imagery, and/or rasterizations based on non-visual states (e.g., states not visible to the naked eye including electric emissions and/or thermal states). Further, the sensor data 108 as determined or generated by the remote computing device 104 can include data associated with the state or characteristics of one or more objects and/or one or more semantic states including for example, images, sounds, and/or electrical emissions from one or more areas (e.g., geographic areas).

Figure 2:
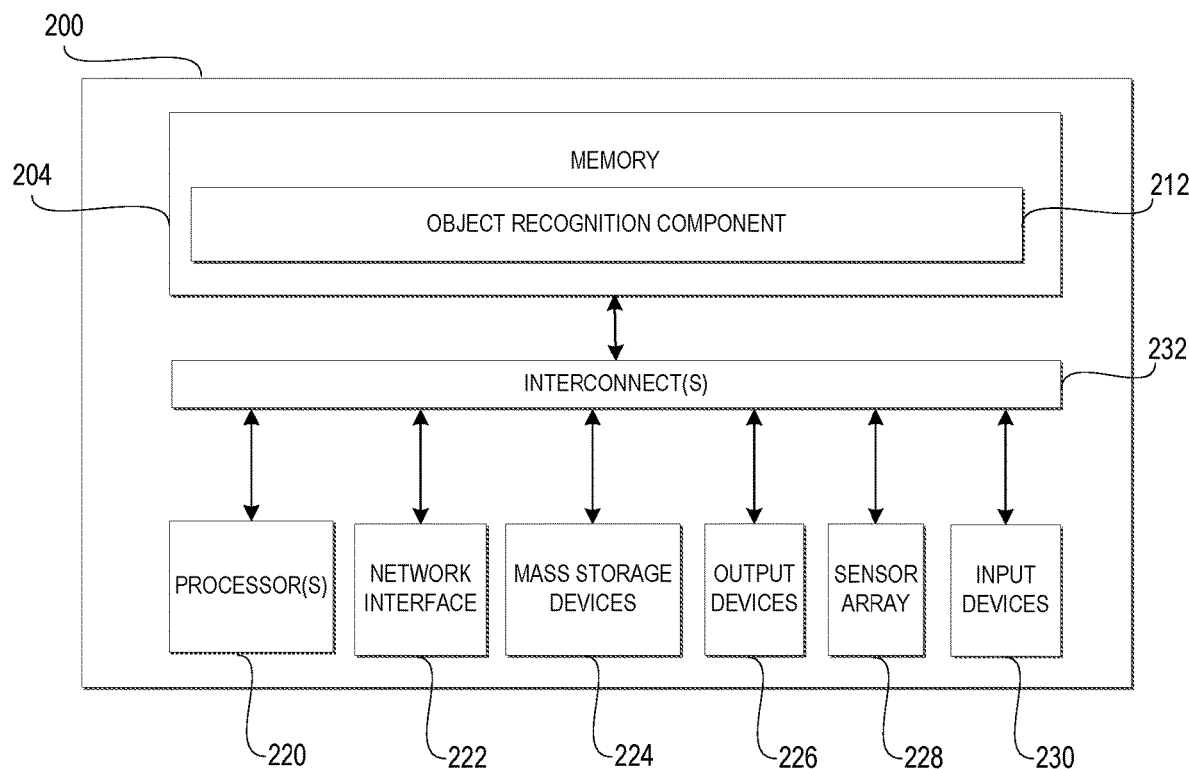
FIG. 2 depicts a diagram of an example device according to example embodiments of the present disclosure.

FIG. 2 depicts an example computing device 200 that can be configured to perform semantic state based sensor updating according to example embodiments of the present disclosure. The computing device 200 can include one or more portions of one or more systems (e.g., one or more computing systems) or devices (e.g., one or more computing devices) including the computing system 102 and/or the remote computing device 104, which are shown in FIG. 1. As shown, the computing device 200 an include a memory 204; an object recognition component 212 that can include one or more instructions that can be stored on the memory 204; one or more processors 220 configured to execute the one or more instructions stored in the memory 204; a network interface 222 that can support network communications; one or more mass storage devices 224 (e.g., a hard disk drive or a solid state drive); one or more output devices 226 (e.g., one or more display devices); a sensor array 228 (e.g., one or more optical and/or audio sensors); one or more input devices 230 (e.g., one or more touch detection surfaces); and/or one or more interconnects 232 (e.g., a bus used to transfer one or more signals or data between computing components in a computing device). The one or more processors 220 can include any processing device that can, for example, process and/or exchange (send or receive) one or more signals or data associated with a computing device.

For example, the one or more processors 220 can include single or multiple core devices including a microprocessor, microcontroller, integrated circuit, and/or logic device. The memory 204 and the storage memory 224 are illustrated separately, however, the components 204 and 224 can be regions within the same memory module. The computing device 200 can include one or more additional processors, memory devices, network interfaces, which may be provided separately or on a same chip or board. The components 204 and 224 can include one or more computer-readable media, including, but not limited to, non-transitory computer-readable media, RAM, ROM, hard drives, flash drives, and/or other memory devices.

The memory 204 can store sets of instructions for applications including an operating system that can be associated with various software applications or data. The memory 204 can be used to operate various applications including a mobile operating system developed specifically for mobile devices. As such, the memory 204 can perform functions that allow the software applications to access data including wireless network parameters (e.g., identity of the wireless network, quality of service), and invoke various services including telephony, location determination (e.g., via global positioning service (GPS) or WLAN), and/or wireless network data call origination services. In other implementations, the memory 204 can be used to operate or execute a general-purpose operating system that operates on both mobile and stationary devices, such as smartphones and desktop computers, for example. In some embodiments, the object recognition component 212 can include a machine learned model that can be used to detect and/or recognize objects. Further, the object recognition component 212 can be used to detect and/or recognize one or more objects or features in one or more areas and in the generation of one or more semantic states.

The sensor array 228 can include one or more sensors that can detect changes in the state of an environment that includes one or more objects. For example, the sensor array 228 can include one or more optical sensors, motion sensors, thermal sensors, audio sensors, haptic sensors, pressure sensors, humidity sensors, and/or electromagnetic sensors. The one or more input devices 230 can include one or more devices for entering input into the computing device 200 including one or more touch sensitive surfaces (e.g., resistive and/or capacitive touch screens), keyboards, mouse devices, microphones, and/or stylus devices. The one or more output devices 226 can include one or more devices that can provide a physical output including visual outputs, audio outputs, and/or haptic outputs. For example, the one or more output devices 226 can include one or more display components (e.g., LCD monitors, OLED monitors, and/or indicator lights), one or more audio components (e.g., loud speakers), and/or one or more haptic output devices that can produce movements including vibrations.

The software applications that can be operated or executed by the computing device 200 can include the object recognition component 110 shown in FIG. 1. Further, the software applications that can be operated or executed by the computing device 200 can include native applications or web-based applications.

In some implementations, the computing device 200 can be associated with or include a positioning system (not shown). The positioning system can include one or more devices or circuitry for determining the position of a device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position. The positioning system can determine a user location of the user device. The user location can be provided to the remote computing device 104 for use by the sensor data provider in determining travel data associated with the computing system 102.

The one or more interconnects 232 can include one or more interconnects or buses that can be used to exchange (e.g., send and/or receive) one or more signals (e.g., electronic signals) and/or data between components of the computing device 200 including the memory 204, the object recognition component 212, the one or more processors 220, the network interface 222, the one or more mass storage devices 224, the one or more output devices 226, the sensor array 228, and/or the one or more input devices 230.

The one or more interconnects 232 can be arranged or configured in different ways including as parallel or serial connections. Further the one or more interconnects 232 can include one or more internal buses to connect the internal components of the computing device 200; and one or more external buses used to connect the internal components of the computing device 200 to one or more external devices. By way of example, the one or more interconnects 232 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, and/or IEEE 1394 interface (FireWire).

Figure 3:
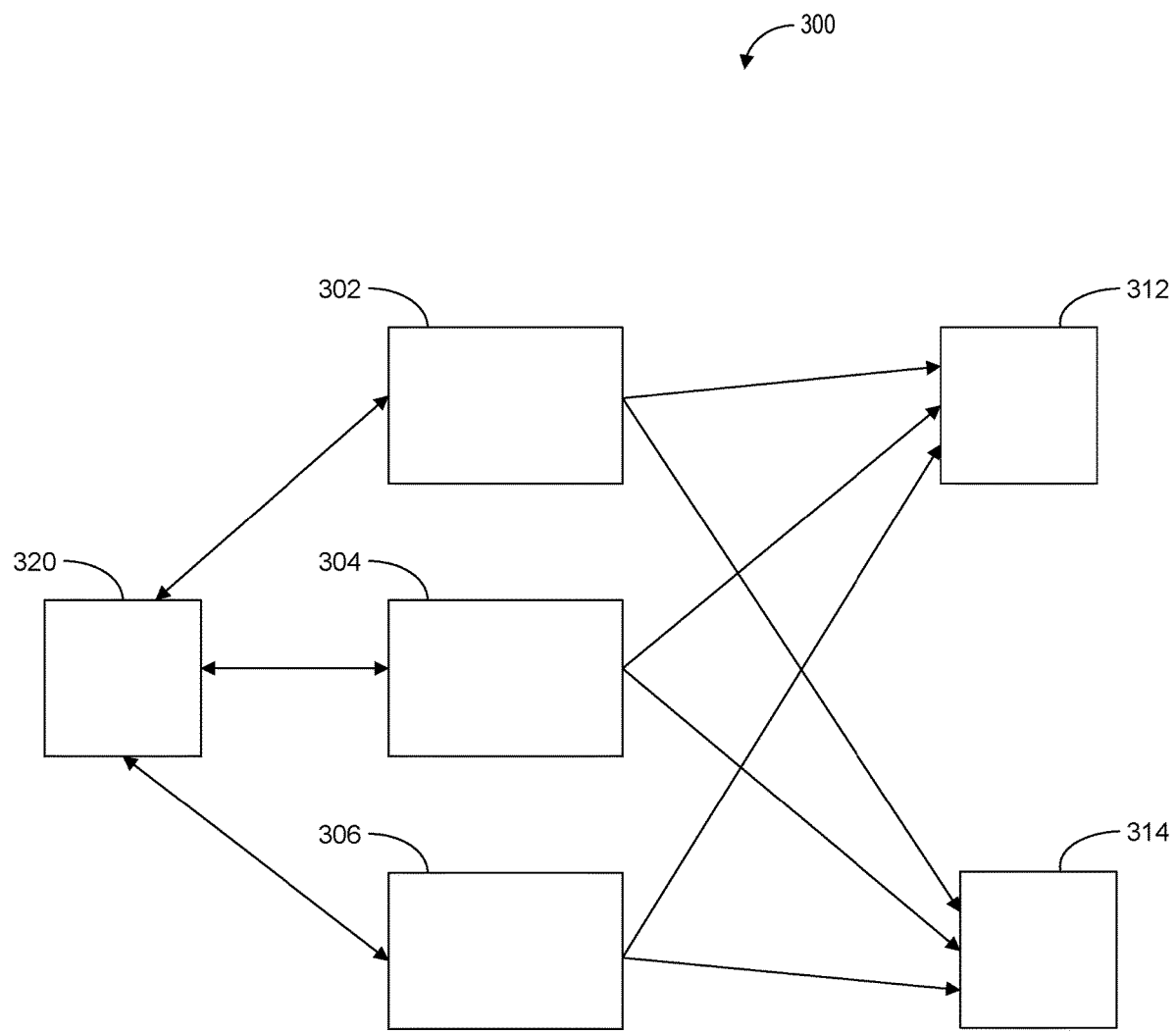
FIG. 3 depicts an example of semantic state based sensor updating according to example embodiments of the present disclosure.

FIG. 3 depicts an example of semantic state based sensor updating according to example embodiments of the present disclosure. FIG. 3 includes an illustration of an environment 300, one or more portions of which can be detected, recognized, and/or processed by one or more systems (e.g., one or more computing systems) or devices (e.g., one or more computing devices) including, the computing system 102 shown in FIG. 1, the remote computing device 104 shown in FIG. 1, and/or the computing device 200 shown in FIG. 2. Further, the detection, recognition, and/or processing of one or more portions of the environment 300 can be implemented as an algorithm on the hardware components of one or more devices or systems (e.g., the computing system 102, the remote computing device 104, and/or the computing device 200) to, for example, generate one or more semantic states and output based on detection of one or more areas. As shown in FIG. 3, the environment 300 includes a sensor 302, a sensor 304, a sensor 306, an area 312, an area 314; and a computing system 320.

The environment 300 includes three different types of sensors (e.g., sensors that generate sensor data based on the detection of different types of states, events, and/or changes in an object detected by the sensors). For example, the sensor 302 can be a satellite that generates image data based on the detection of a terrestrial area from a low Earth orbit (e.g., an orbit with an altitude of two thousand kilometers or less); the sensor 304 can be a satellite that generates image data based on the detection of a terrestrial area from a low Earth orbit at a higher resolution than the sensor 302; and the sensor 306 can be a sensor that detects one or more signals (e.g., electronic signals) from electronic devices including cellular telephones. The sensors 302, 304, and 306 can, as shown in FIG. 3, generate sensor data for the area 312 and the area 314 respectively.

The computing system 320 (e.g., a computing system that includes the features of the remote computing device 104) can receive one or more signals or data from the sensors 302, 304, and 306. Further, the computing system 320 can send one or more signals to the sensors 302, 304, 306 including one or more signals requesting sensor data. Based on the one or more signals or data received from the sensors 302, 304, 306, the computing system 320 can generate semantic states associated with the area 312 and the area 314. Due to the differences in the states that are detected by the sensors 302, 304, and 306, the one or more signals or data received by the computing system 320 from each of the sensors 302, 304, and 306 can be used to determine different values for different attributes of a semantic state associated with the areas 312 and 314.

For example, when the sensor 302 generates image data associated with the visual state of area 312 at a resolution of ten meters per pixel and the sensor 304 generates image data associated with the visual state of area 312 at a resolution of fifty centimeters per pixel (i.e., twenty times greater than the resolution of sensor 302) the greater resolution of the sensor 304 can allow for the capture of details that the senor 302 does not capture. Further, the sensor 302 and sensor 304 can generate image data of the area 312 that can be used by the computing system 320 to generate a semantic state that includes a house density attribute associated with the number of houses in the area 312. Because houses are large objects, the difference in the resolution of sensor 302 and sensor 304 may not result in a significant difference in generating a semantic state that includes a housing density attribute. However, if the computing system 320 generates a semantic state that includes a mail box density attribute associated with the density of mail boxes in the area 312, then the image data from the sensor 304 will be of high enough resolution to resolve a mailbox, but the low resolution of the sensor 302 may not. As such, even though the sensor 302 and the sensor 304 are generating the same type of data (e.g., image data), the semantic state attributes that the computing system 320 can generate based on the image data from the sensor 302 and the sensor 304 can be different.

In the case in which the sensor data for the sensor 304 is out of date (e.g., the sensor data has not been updated for a predetermined amount of time), an estimated semantic state of the area 312 can be determined based on the sensor data received from the sensor 302. Based on an uncertainty level generated for the estimated semantic state, an uncertainty level can be determined, and when the uncertainty level exceeds an uncertainty threshold level, sensor data from the sensor 304 can be obtained. In this way, sensor data can be obtained in a manner that is timely and also conserves computational and other resources by not obtaining sensor data from potentially resource expensive higher resolution sensors when the uncertainty level of an estimated semantic state does not exceed an uncertainty level threshold.

In another example, the sensor 306 can generate sensor data based on the detection of cell phone activity in the area 314. The sensor 304 can include sensor data, that was most recently obtained six months ago, that includes one or more images of the area 314 that are indicative of the area 314 being an uninhabited forest. The computing system 320 can generate an estimated semantic state of the area 314 based in part on sensor data from the sensor 306 which detects one or more signals indicative of a modest level of wireless activity in area 314 over the course of the past three months, the computing system 320 can determine that an uncertainty level for the sensor 306 satisfies one or more update criteria and that the computing system 320 can send one or more signals requesting updated sensor data from the sensor 304.

Figure 4:
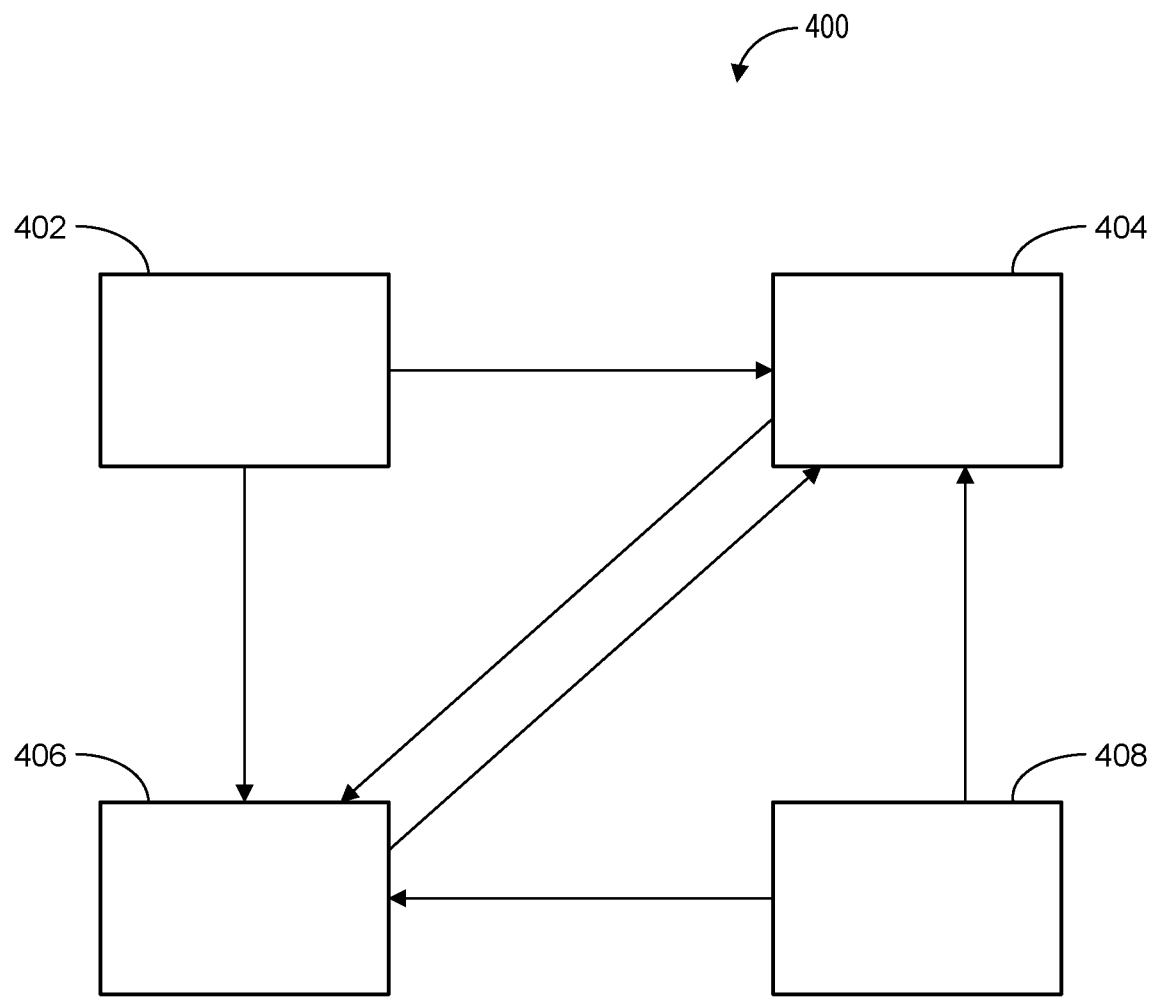
FIG. 4 depicts an example of semantic state based sensor updating according to example embodiments of the present disclosure.

FIG. 4 depicts an example of semantic state based sensor updating according to example embodiments of the present disclosure. FIG. 4 includes an illustration of an environment 400, one or more portions of which can be detected, recognized, and/or processed by one or more systems (e.g., one or more computing systems) or devices (e.g., one or more computing devices) including a semantic processing system audio component 410 that can include one or more portions of the computing system 102 shown in FIG. 1, the remote computing device 104 shown in FIG. 1, and/or the computing device 200 shown in FIG. 2. Further, the detection, recognition, and/or processing of one or more portions of the environment 400 can be implemented as an algorithm on the hardware components of one or more devices or systems (e.g., the computing system 102, the remote computing device 104, and/or the computing device 200) to, for example, generate one or more semantic states and output based on detection of one or more areas. As shown in FIG. 4, the environment 400 includes a semantic processing system audio output component 410.

The environment 400 includes four different sensors, each of which detects a different state of an area. In this example, the sensor 402 can be a low resolution (e.g., a sensor that generates lower resolution sensor data than the sensor 404) satellite-based sensor that detects an area (not shown); the sensor 404 can be a high resolution (e.g., a sensor that generates higher resolution sensor data than the sensor 402) satellite-based sensor that detects the same area as the sensor 402; the sensor 406 can be a ground based sensor that generates very high resolution sensor data (e.g., sensor data that is higher resolution than sensor 402 and 406) based on detection of the same area as the area detected by the sensor 402; and the sensor 408 that detects one or more wireless signals from the same area as the sensor 402.

As shown in FIG. 4, the direction indicated by the arrows between the sensors 402, 404, 406, and 408, can indicate the sensors that are useful (e.g., that have a lower resolution and/or that have intersecting semantic state attributes based on different sensor inputs) for generating an estimated semantic state for a sensor that has not been updated recently (e.g., within a predetermined time period). For example, the sensor 402 can be useful for generating an estimated semantic state (e.g., semantic state associated with housing density in an area) for an area detected by the sensor 404 and/or the sensor 406, since the resolution of the sensor 402 is lower than the sensor 404. The sensor 404 and/or the sensor 406 could be used to generate an estimated semantic state of an area detected by the sensor 402, however, since the sensor data from the sensor 404 and the sensor 406 are of higher resolution and of the same type as the sensor 402, the sensor 404 and the sensor 406 can be used to determine the actual semantic state of the area detected by the sensor 402 without receiving sensor data from the sensor 402 or generating an estimated semantic state.

In another example, the sensor 408 can be useful in generating an estimated semantic state for an area (e.g., road beacon density) detected by the sensor 404 and/or the sensor 406, since the sensor 408 detects one or more wireless signals which can be correlated with the number of road beacons that produce one or more wireless signals. In contrast, the sensor 404 and the sensor 406 are not high resolution enough to detect road beacons due to the road beacons being too small and accordingly cannot be used to generate a semantic state associated with the road beacon density in the area detected by the sensor 404 and/or the sensor 406.

In another example, the sensor 404 can generate an estimated semantic state for the sensor 406 and the sensor 406 can generate an estimated semantic state for the sensor 404. The sensor 404 and the sensor 406 can generate sensor data that includes images, however, the images are from a different perspective (e.g., sensor 404 is from a satellite perspective and sensor 406 is from a ground based perspective), hence the sensor data generated by the sensor 404 and the sensor 406 is of a different type and both the sensor 404 and the sensor 406 can detect features of the area detected by the sensor 402 that not detected by the other sensor (e.g., the sensor 406 can detect portions of the ground that are below cloud cover that can obscure the ground from the sensor 404).

Figure 5:
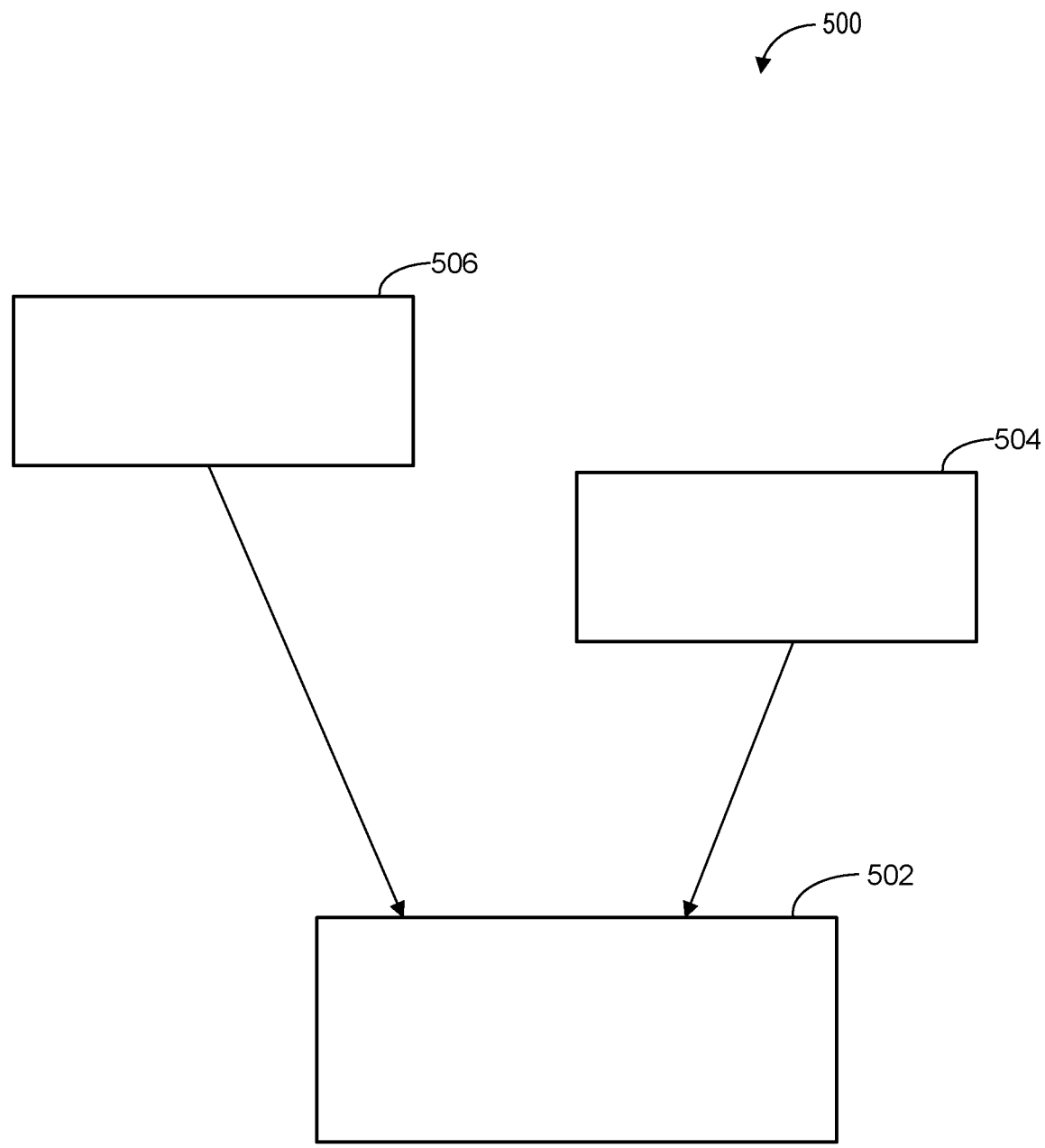
FIG. 5 depicts an example of semantic state based sensor updating according to example embodiments of the present disclosure.

FIG. 5 depicts an example of semantic state based sensor updating according to example embodiments of the present disclosure. FIG. 5 includes an illustration of an environment 500, one or more portions of which can be detected, recognized, and/or processed by one or more systems (e.g., one or more computing systems) or devices (e.g., one or more computing devices) including a computing system 502 that can include one or more portions of the computing system 102 shown in FIG. 1, the remote computing device 104 shown in FIG. 1, and/or the computing device 200 shown in FIG. 2. Further, the detection, recognition, and/or processing of one or more portions of the environment 500 can be implemented as an algorithm on the hardware components of one or more devices or systems (e.g., the computing system 102, the remote computing device 104, and/or the computing device 200) to, for example, generate one or more semantic states and output based on detection of one or more areas. As shown in FIG. 5, the environment 500 includes a computing system 502, a sensor 504, and a sensor 506.

The environment includes the sensor 506 which can be a low resolution optical sensor that is located in a low Earth orbit satellite and can be configured to send sensor data to the computing system 502 on a minute to minute basis, and a sensor 504 which can be a high resolution optical sensor that is located on a low Earth orbit satellite that also can be configured to send sensor data to the computing system 502 on a minute to minute basis. In this example, the sensor 506, due to its greater resolution, can use resources (e.g., bandwidth to send the sensor data) that are five times greater than the sensor 504. Accordingly, to optimize resource usage of the sensor 504 and the sensor 506, the computing system 502 can generate an estimated semantic state for the sensor 504 for an area that is detected by both the sensor 506 and the sensor 504. Based on an uncertainty level associated with the estimated semantic state of the area detected by the sensor 504 and the sensor 506, the computing system can determine, based on one or more update criteria (e.g., criteria including a threshold uncertainty level that indicates when a sensor's estimated semantic state is too uncertain and sensor data can be requested from the sensor), when to obtain sensor data from the sensor 506. In this way, the computing system can conserve bandwidth utilization associated with receiving sensor data from the sensor 506 and can maximize other resources associated with the utilization of scarce sensor resources.

Figure 6:
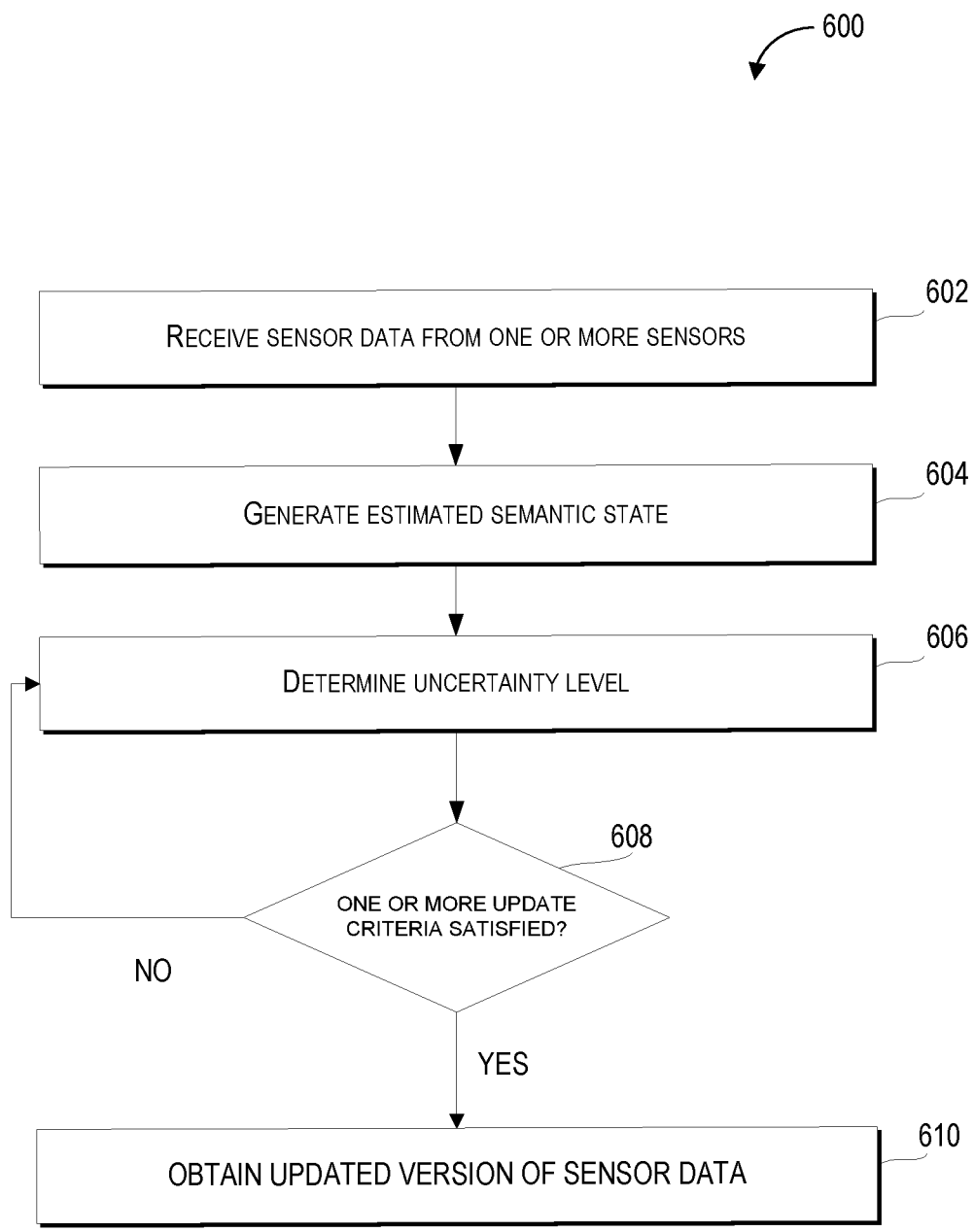
FIG. 6 depicts a flow diagram of semantic state based sensor updating according to example embodiments of the present disclosure.

FIG. 6 depicts a flow diagram of an example method of semantic state based sensor updating according to example embodiments of the present disclosure. One or more portions of the method 600 can be executed or implemented on one or more computing devices or computing systems including, for example, the computing system 102, the remote computing device 104, and/or the computing device 200. One or more portions of the method 600 can also be executed or implemented as an algorithm on the hardware components of the devices disclosed herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include receiving sensor data that is based in part on one or more sensor outputs from one or more sensors. The sensor data can include information associated with one or more states of one or more areas (e.g., geographical areas) detected by the one or more sensors. In some embodiments, the one or more sensors can include one or more optical sensors (e.g., one or more cameras), one or more acoustic sensors (e.g., one or more sonar devices), one or more infrared sensors, one or more electromagnetic sensors (e.g., one or more sensors that can detect electrical and magnetic fields), one or more radiofrequency signal sensors (e.g., one or more devices that can detect the presence and/or strength of radio waves), or one or more thermal sensors (e.g., one or more thermometers, thermocouples, and/or thermistors).

Further, the one or more sensors can be associated with and/or located on a variety of devices including one or more satellites (e.g., satellites that orbit the Earth); aerial platforms (e.g., one or more aircraft, helicopters, balloons, blimps, dirigibles, and/or drones); personal electronic devices (e.g., one or more smartphones, tablets, and/or personal digital cameras); ground-based vehicles (e.g., one or more automobiles, buses, and/or trains); and/or marine craft (e.g., boats).

The one or more sensors can be configured to detect the state (e.g., a physical state) of the one or more areas including one or more properties or characteristics of the one or more areas. Further, the semantic state system can access a chronometer (e.g., a locally based chronometer or a chronometer at a remote location) that can be used to determine a date, a time of day, and/or a duration of one or more events including one or more sensor events associated with detecting the state of the one or more areas, obtaining sensor data from the one or more sensors, and/or the state of the one or more areas at one or more time periods.

For example, the one or more sensors can be configured to detect the state of the one or more areas periodically including on a per second, per minute, per hour, per day, per week, per month, and/or per year basis. The one or more properties or characteristics of the one or more areas can include a time of day, a geographic location (e.g., a latitude and longitude associated with the environment), a size (e.g., a height, length, and/or width), mass, weight, volume, color, frequency of one or more signals, magnitude of one or more signals, and/or sound emanations from the one or more areas.

At 604, the method 600 can include generating, based in part on the sensor data, an estimated semantic state of an area of the one or more areas from a target sensor of the one or more sensors from which the sensor data has not been received for a predetermined period of time. The duration of the predetermined period of time can vary (e.g., ten minutes long, two hours long, or a thirty second long period of time) based on the purpose for which the semantic state of the area is used (e.g., live reports on tidal conditions on a beach can have a shorter predetermined period of time before generating the estimated semantic state than a survey of an area of water in the middle of the Atlantic ocean).

In some embodiments, the target sensor can be configured to detect the state of the one or more areas at a resolution that is higher than a resolution associated with the one or more sensors. For example, the one or more sensors can be located on a satellite that captures images from low orbit and is able to resolve images at a resolution of ten meters per pixel, and the target sensor can include one or more ground based sensors (e.g., a smartphone camera) that can resolve images at a resolution of 1 micrometer per pixel.

At 606, the method 600 can include determining an uncertainty level associated with an accuracy, precision, and/or uncertainty of the data previously-obtained using the target sensor. The uncertainty level can include a probability that the estimated semantic state is the same as an updated semantic state of the area based on the updated version of the sensor data from the target sensor. For example, the uncertainty level can indicate a probability and/or likelihood that the estimated semantic state is an accurate and/or true reflection of the actual state of the area (e.g., the actual state of the area at the time the estimated semantic state was generated) as would be indicated by the updated version of the sensor data from the target sensor.

Further, the uncertainty level can be based in part on a comparison of the estimated semantic state to one or more semantic states of the area from the one or more sensors not including the target sensor. For example, the comparison of the estimated semantic state to one or more semantic states can include a comparison of the types or number of semantic state attributes, which can be weighted according to their significance or importance. Further, the determination of the uncertainty level can be based in part on a determination of the frequency with which the sensor data was previously obtained and/or changes in the frequency with which the sensor data was obtained. For example, sensor data that was more recently obtained can have a lower uncertainty level than sensor data that was obtained long ago, and senor data that was frequently updated with no changes detected between updates can have a lower uncertainty level than sensor data that is infrequently updated with large changes detected between updates.

At 608, the method 600 can include determining whether, when, or that, one or more update criteria have been satisfied. In some embodiments, uncertainty level (e.g., the uncertainty level determined at 606) can be compared to a threshold uncertainty level. Satisfying the one or more update criteria can include the uncertainty level exceeding the threshold uncertainty level. For example, the one or more update criteria can include the uncertainty level exceeding a threshold uncertainty level (e.g., the uncertainty level is greater than twenty percent). In this way, the sensor data can be updated more frequently through use of a lower threshold uncertainty level (e.g., a threshold uncertainty of ten percent) and less frequently through use of a higher threshold uncertainty level (e.g., a threshold uncertainty level of eighty percent).

In response to satisfying the one or more update criteria, the method 600 proceeds to 610. In response to not satisfying the one or more update criteria, the method 600 can end or return to a previous part of the method 600 including 602, 604, or 606.

At 610, the method 600 can include obtaining an updated version of the sensor data from the target sensor. Obtaining, an updated version of the sensor data from the target sensor can include sending one or more signals to the target sensor or a computing device associated with the target sensor. The one or more signals can include a request for the updated version of the sensor data. For example, when the target sensor is a satellite that generates sensor data based on the state of one or more areas on the Earth's surface, a computing device (e.g., the computing system 102) can send a wireless signal to the satellite. The wireless signal can include data requesting updated sensor data from the satellite. In response to receiving the request for the updated version of the sensor data, the satellite can send the updated sensor data to the computing device. The updated sensor data sent from the satellite can include sensor data associated with the state of the one or more areas at the time the sensor data was sent (e.g., real-time sensor data) and/or sensor data that was captured at a previous time period (e.g., sensor data that was captured in the preceding week period).

Figure 7:
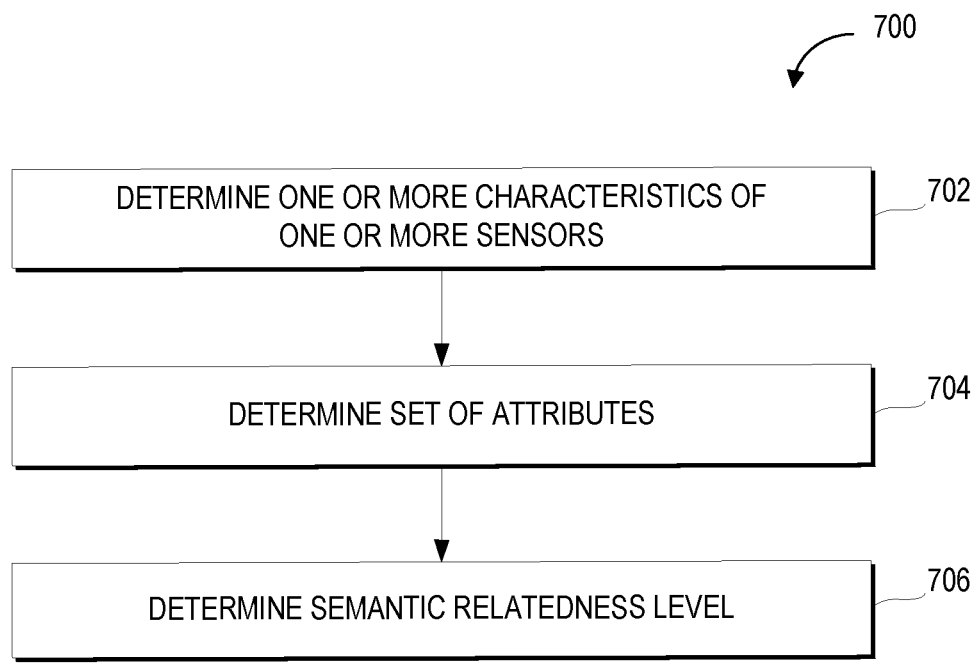
FIG. 7 depicts a flow diagram of semantic state based sensor updating according to example embodiments of the present disclosure.

FIG. 7 depicts a flow diagram of an example method of semantic state based sensor updating according to example embodiments of the present disclosure. One or more portions of the method 700 can be executed or implemented on one or more computing devices or computing systems including, for example, the computing system 102, the remote computing device 104, and/or the computing device 200. One or more portions of the method 700 can also be executed or implemented as an algorithm on the hardware components of the devices disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include determining one or more characteristics of the one or more sensors. The one or more characteristics can include a type of the one or more sensors (e.g., one or more optical sensors, radiofrequency signal sensors, sonic sensors, and/or thermal sensors); a resolution of the one or more sensors (e.g., a resolution associated with the smallest amount of change that the sensor can detect); an operational status of the one or more sensors (e.g., an indication of whether a sensor is operational, whether the one or more sensors are fully or partially operational, whether the sensor is offline or online, when a partially operational sensor will return to being fully operational, and/or when an inoperative sensor will return to being partially or fully operational); and/or a sampling rate of the one or more sensors (e.g., the frequency with which the one or more sensors detect an area, generate sensor outputs, and/or send sensor data). For example, the one or more characteristics of the one or more sensors can include a sensor type indicating that one of the one or more sensors is a geosynchronous satellite in lower Earth orbit at an altitude of one thousand five hundred kilometers and that the satellite has a resolution of twenty meters per pixel.

At 704, the method 700 can include determining a set of the attributes that is based in part on a similarity of the one or more characteristics between the target sensor and the one or more sensors not including the target sensor. For example, the one or more characteristics of a pair of sensors (e.g., a target sensor and one other non-target sensor) can include that the two sensors are optical sensors with a resolution of ten meters per pixel and thirty meters per pixel respectively.

Based in part on the similarity between the pair of sensors (both sensors are optical sensors) and the similarity in the resolution of the sensors, the set of attributes associated with the one or more semantic states and the estimated semantic state of an area can be related to the type of information that the pair of sensors can both determine. As such, since the pair of sensors are optical sensors, and have a higher level of similarity, the outputs from the pair of sensors can be used to generate a set of attributes associated with amount of sunlight received in an area. However, if the one or more characteristics of one of the pair of sensors indicated that the sensor was an acoustic sensor (e.g., a sonar device) and the other sensor was an optical sensor, the output from the acoustic sensor would be different enough from the output from the optical sensor that the similarity between the pair of sensors would be low. As such, sensor data from the pair of dissimilar sensors would be less likely to be used to generate a set of attributes associated with the amount of sunlight received in an area.

In some embodiments, the comparison of the estimated semantic state to the one or more semantic states can be based in part on the set of attributes (e.g., comparing the set of attributes in the estimated semantic state to the set of attributes in the one or more semantic states).

At 706 the method 700 can include determining a semantic relatedness level for the sensor data received from the one or more sensors. The semantic relatedness level can be based in part on how many of the set of attributes in the estimated semantic state are in the one or more semantic states of the area from the one or more sensors not including the target sensor. For example, when the set of attributes in the estimated semantic state is the same as the amount of the set of attributes in the one or more semantic states of the area from the one or more sensors not including the target sensor, the semantic relatedness level would be higher than if none of the set of attributes were in common between the estimated semantic state and the one or more semantic states of the area from the one or more sensors not including the target sensor.

In some embodiments, the uncertainty level can be based in part on the semantic relatedness level (e.g., the semantic relatedness level between sensors can be used as a weighting factor for determining the uncertainty level, such that sensors with a higher semantic relatedness level can have a greater weighting than sensors with a lower semantic relatedness level).

Figure 8:
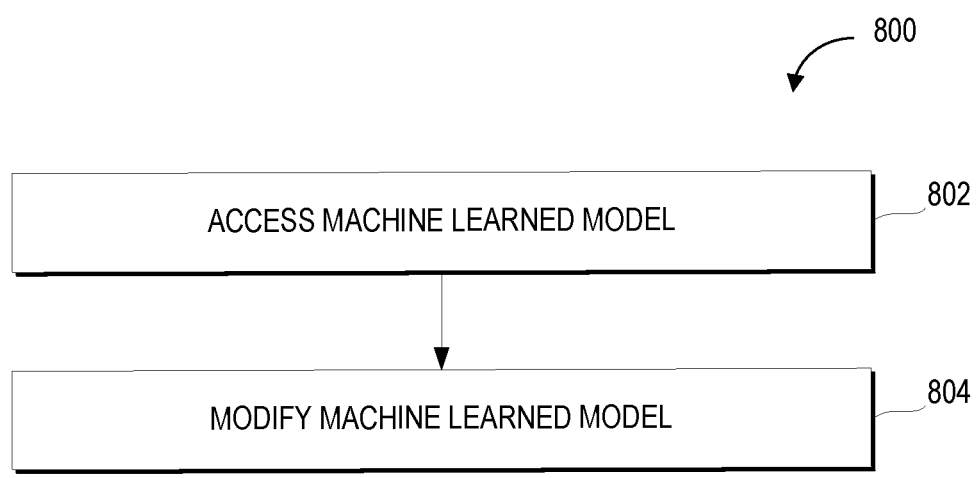
FIG. 8 depicts a flow diagram of semantic state based sensor updating according to example embodiments of the present disclosure.

FIG. 8 depicts a flow diagram of an example method of semantic state based sensor updating according to example embodiments of the present disclosure. One or more portions of the method 800 can be executed or implemented on one or more computing devices or computing systems including, for example, the computing system 102, the remote computing device 104, and/or the computing device 200. One or more portions of the method 800 can also be executed or implemented as an algorithm on the hardware components of the devices disclosed herein. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include accessing a machine learned model (e.g., a machine learned model that has been stored locally and/or a machine learned model that is stored on a remote computing device) that is based in part on a training dataset associated with a plurality of classified image labels and classified image features of one or more images (e.g., one or more satellite images, and/or ground-based camera images) and/or other types of detectable states (e.g., an amount of computing network traffic, an amount of wireless transmissions, carbon emissions, noise levels, electricity usage, and/or water usage). Further, the estimated semantic state and/or the one or more semantic states can include an embedding vector that is received from the machine learned model in response to input of the sensor data into the machine learned model. As such, the generation of the estimated semantic data can be based in part on accessing the machine learned model.

The machine learned model can be generated using a classification dataset including classifier data that includes a set of classified features and a set of classified object labels associated with training data that is based on, or associated with, a plurality of training inputs used to train the machine learned model to achieve a desired output (e.g., detecting one or more objects, such as buildings or waterways, in a satellite image). The classification dataset can be based in part on inputs to one or more sensors (e.g., visual inputs to cameras on satellites and/or cameras at ground level) that have been used to generate one or more sensor outputs. For example, the machine learned model can be created using a set of cameras that capture training data including the amount and location of one or more wireless transmissions from one or more geographic areas over a period of time. The geographic areas can include various objects including buildings (e.g., houses, cottages, office buildings, and/or apartment buildings), streets, vehicles, people, natural features, waterbodies, and/or waterways.

In some embodiments, the machine learned model can be based in part on one or more classification techniques including a neural network, a convolutional neural network, linear regression, logistic regression, random forest classification, boosted forest classification, gradient boosting, a support vector machine, or a decision tree. The semantic state system can use various techniques to estimate the semantic state of an area, either in combination with the machine learned model or without the machine learned model. For example, the semantic state system can use one or more techniques including Kalman filtering, Bayesian inference, Hidden Markov models, one or more genetic algorithms, edge matching, greyscale matching, gradient matching, and/or pose clustering.

At 804, the method 800 can include modifying the machine learned model based in part on training data that includes one or more error rates or one or more uncertainty levels associated with the one or more sensors over a plurality of time periods. The one or more error rates or the one or more uncertainty levels can be stored in one or more storage devices associated with the machine learned model. The stored one or more error rates and the stored one or more uncertainty levels can then be compared to actual sensor associated with the sensors from which the one or more uncertainty levels or the one or more error rates were generated. For example, the machine learned model can be modified based in part on the extent to which an estimated semantic state determined in part by the machine learned model corresponds to the actual state of an area based on updated sensor data. In this way, the machine learned model can adapt over time based on actual sensor data that is received and feedback based on whether the output was correct.

Figure 9:
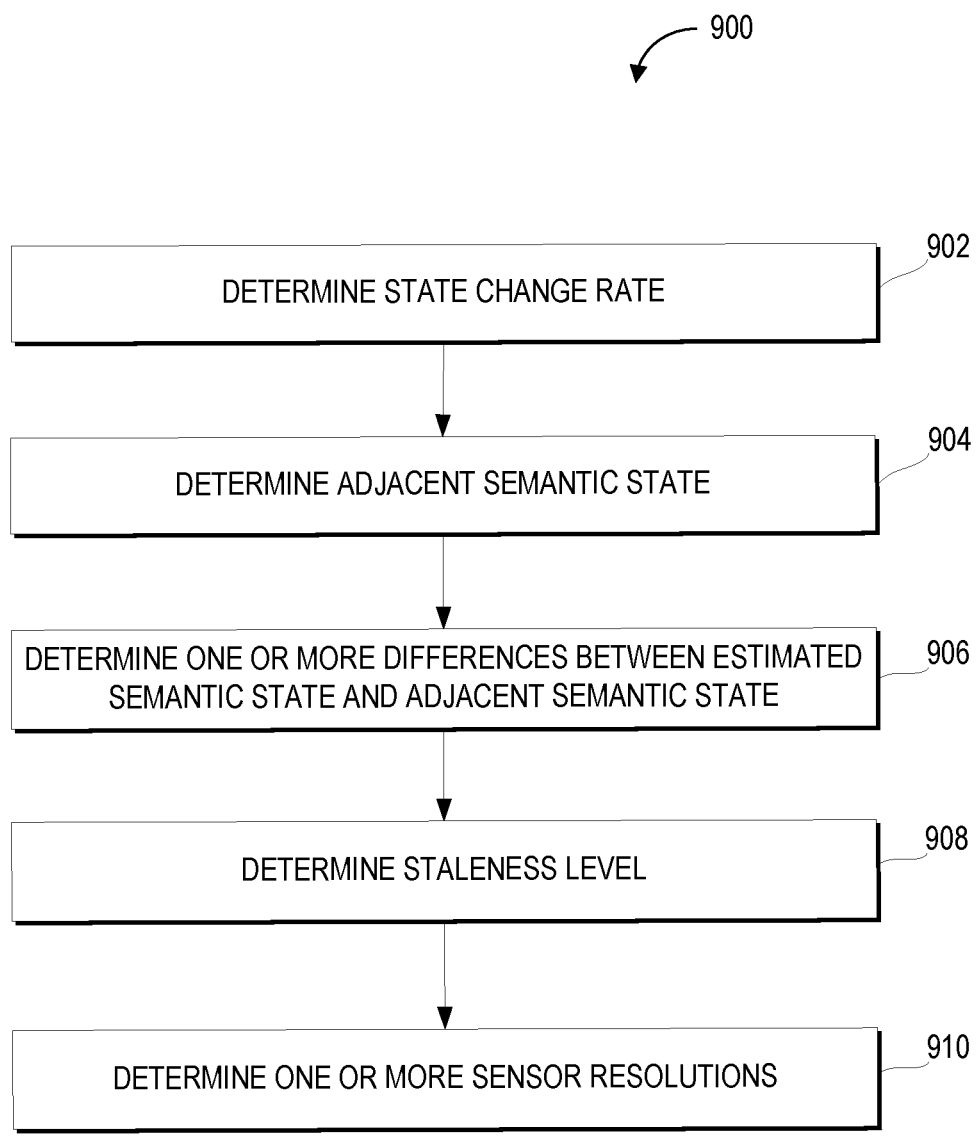
FIG. 9 depicts a flow diagram of semantic state based sensor updating according to example embodiments of the present disclosure.

FIG. 9 depicts a flow diagram of an example method of semantic state based sensor updating according to example embodiments of the present disclosure. One or more portions of the method 900 can be executed or implemented on one or more computing devices or computing systems including, for example, the computing system 102, the remote computing device 104, and/or the computing device 200. One or more portions of the method 900 can also be executed or implemented as an algorithm on the hardware components of the devices disclosed herein. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining a state change rate that is based in part on an amount of one or more changes in the one or more semantic states of the area over a plurality of time periods. For example, an area that is transformed, in a short period of time, from a large shopping center with hundreds of stores to and thousands of daily visitors to an abandoned shopping center that is being prepared for demolition, will have a very high state change rate in terms of semantic state associated with the population density of the area even though the semantic state with respect to the building density will not change substantially until after the shopping center is demolished.

Further, a suburban area that is unchanged except for the construction of a new elementary school can have a level of wireless network traffic that is not significantly changed after construction of the elementary school and accordingly the semantic state associated with the population density of the area can also, in some embodiments, not change substantially. In some embodiments, the uncertainty level associated with the target sensor can be based in part on the state change rate (e.g., a greater state change rate can correspond to a greater uncertainty level).

At 904, the method 900 can include determining an adjacent semantic state based in part on one or more semantic states of the one or more areas that are adjacent to the area. The one or more areas adjacent to the area can include one or more areas that are geographically adjacent (e.g., areas that share a border) and/or one or more areas that fulfill one or more adjacency criteria associated with a distance between the areas (e.g., the one or more adjacency criteria can be satisfied by an area being within an adjacency threshold distance of another area).

At 906, the method 900 can include determining one or more differences between the estimated semantic state of the area and the adjacent semantic state. For example, the one or more differences between the estimated semantic state of the area and the adjacent semantic state can include a comparison of the set of attributes in the estimated semantic state to the set of attributes in the adjacent semantic state to determine how many of the set of attributes are in common between the estimated semantic state and the adjacent semantic state as well as the magnitude of the differences in the set of attributes of between the estimated semantic state and the adjacent semantic state. In some embodiments, the uncertainty level can be based in part on an extent of the one or more differences between the set of attributes that are in common between the estimated semantic state and the adjacent semantic state (e.g., a greater difference between the semantic state and the adjacent semantic state can correspond to a greater uncertainty level).

At 908, the method 900 can include determining a staleness level for the target sensor. The staleness level can be based in part on the duration since the sensor data was most recently received from the target sensor (i.e., the staleness level can increase as the time that passes between receiving sensor data from a sensor increases). The staleness level can be based in part on an expectation of the rate at which sensor data from a sensor is received. For example, a sensor that provides traffic updates on a portion of road may have a very high staleness level after thirty minutes, whereas a sensor that provides Canada goose migration updates may have a low staleness level if a sensor update is provided on a daily basis.

Further, the staleness level can be based in part on the completeness of the sensor data that is received from a sensor. For example, a sensor that provides image data for an area can, due to data loss during transmission of the sensor data, include image artifacts that obscure portions of the images derived from the sensor data. Accordingly, the obscured images derived from the sensor data may, due to their low quality, result in older sensor data being used even though more recent sensor data is available. In some embodiments, the uncertainty level can be based in part on the staleness level (e.g., the uncertainty level will increase as the staleness level increases).

At 910, the method 900 can include determining one or more sensor resolutions of the one or more sensors (e.g., accessing sensor type data including the sensor resolution for a sensor). The one or more sensor resolutions can be based in part on an amount of change in the one or more states of the one or more areas that the one or more sensors are able to detect (i.e., sensors with a greater resolution can detect a smaller amount of change in the one or more states of an area). For example, one or more signals including data associated with a request for sensor resolution can be sent to the one or more sensors. The one or more sensors, or a computing device associated with the one or more sensors, can send data associated with the sensor resolution of the respective sensors. In some embodiments, the uncertainty level determined for the most recent data provided by the target sensor may be dependent on the sensor resolutions of the one or more sensors not including the target sensor. For instance, the uncertainty level can be inversely proportional to the one or more sensor resolutions of the one or more sensors not including the target sensor.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
   receiving, by a computing system comprising one or more computing devices, sensor data based in part on one or more sensor outputs from one or more sensors including a target sensor, wherein the sensor data comprises information associated with one or more states of one or more areas detected by the one or more sensors;
   generating, by the computing system, based in part on the sensor data, an estimated semantic state of an area of the one or more areas from the target sensor;
   determining, by the computing system, based in part on a comparison of the estimated semantic state to one or more semantic states of the area from the one or more sensors not including the target sensor, an uncertainty level associated with an accuracy of the estimated semantic state; and responsive to the uncertainty level satisfying one or more update criteria, obtaining, by the computing system, an updated version of the sensor data from the target sensor.

2. The computer-implemented method of claim 1, wherein the target sensor is configured to detect the state of the one or more areas at a resolution that is higher than a resolution associated with the one or more sensors not including the target sensor.

3. The computer-implemented method of claim 1, wherein the estimated semantic state and the one or more semantic states comprise a set of attributes associated with the one or more states of the area from the target sensor and the one or more sensors not including the target sensor respectively.

4. The computer-implemented method of claim 3, further comprising:
determining, by the computing system, one or more characteristics of the one or more sensors, wherein the one or more characteristics comprise a type of the one or more sensors, a resolution of the one or more sensors, or a sampling rate of the one or more sensors; and
determining, by the computing system, the set of attributes based in part on a similarity of the one or more characteristics between the target sensor and the one or more sensors not including the target sensor, wherein the comparison of the estimated semantic state to the one or more semantic states is based in part on the set of attributes.

5. The computer-implemented method of claim 3, further comprising:
determining, by the computing system, a semantic relatedness level for the sensor data received from the one or more sensors, wherein the semantic relatedness level is based in part on how many of the set of attributes in the estimated semantic state are in the one or more semantic states of the area from the one or more sensors not including the target sensor, wherein the uncertainty level is based in part on the semantic relatedness level.

6. The computer-implemented method of claim 3, wherein the set of attributes comprises a building concentration, a road concentration, a waterbody concentration, a forest concentration, or a vehicle concentration.

7. The computer-implemented method of claim 1, further comprising:
determining, by the computing system, a state change rate based in part on an amount of one or more changes in the one or more semantic states of the area over a plurality of time periods, wherein the uncertainty level of the target sensor is based in part on the state change rate.

8. The computer-implemented method of claim 1, further comprising:
determining, by the computing system, an adjacent semantic state based in part on one or more semantic states of the one or more areas that are adjacent to the area; and
determining, by the computing system, one or more differences between the estimated semantic state of the area and the adjacent semantic state, wherein the uncertainty level is based in part on an extent of the one or more differences between the semantic state and the adjacent semantic state.

9. The computer-implemented method of claim 1, further comprising:
determining, by the computing system, a staleness level of the target sensor based in part on a duration since the sensor data was most recently received from the target sensor, wherein the uncertainty level is based in part on the staleness level.

10. The computer-implemented method of claim 1, further comprising:
determining, by the computing system, one or more sensor resolutions of the one or more sensors, the one or more sensor resolutions based in part on an amount of change in the one or more states of the one or more areas that the one or more sensors are able to detect, wherein the uncertainty level is inversely proportional to the one or more sensor resolutions of the one or more sensors not including the target sensor.

11. The computer-implemented method of claim 1, wherein the uncertainty level comprises a probability that the estimated semantic state is the same as an updated semantic state of the area based on the updated version of the sensor data from the target sensor.

12. The computer-implemented method of claim 1, further comprising:
accessing, by the computing system, a machine learned model that is based in part on a training dataset associated with a plurality of classified image labels and classified image features of one or more images, wherein the generating the estimated semantic state is based in part on the accessing the machine learned model.

13. The computer-implemented method of claim 12, further comprising:
modifying, by the computing system, the machine learned model based in part on training data comprising one or more error rates or one or more uncertainty levels associated with the one or more sensors over a plurality of time periods.

14. The computer-implemented method of claim 12, wherein the estimated semantic state or the one or more semantic states comprise an embedding vector received from the machine learned model in response to input of the sensor data into the machine learned model.

15. One or more tangible, non-transitory computer-readable media storing computer-readable instructions that when executed by one or more processors cause the one or more processors to perform operations, the operations comprising:
receiving sensor data based in part on one or more sensor outputs from one or more sensors including a target sensor, wherein the sensor data comprises information associated with one or more states of one or more areas detected by the one or more sensors;
generating, based in part on the sensor data, an estimated semantic state of an area of the one or more areas from the target sensor;
determining, based in part on a comparison of the estimated semantic state to one or more semantic states of the area from the one or more sensors not including the target sensor, an uncertainty level associated with an accuracy of the estimated semantic state; and
responsive to the uncertainty level satisfying one or more update criteria, obtaining an updated version of the sensor data from the target sensor.

16. The one or more tangible, non-transitory computer-readable media of claim 15, wherein the estimated semantic state and the one or more semantic states comprise a set of attributes associated with the one or more states of the area from the target sensor and the one or more sensors not including the target sensor respectively.

17. The one or more tangible, non-transitory computer-readable media of claim 16, further comprising:
   determining one or more characteristics of the one or more sensors, wherein the one or more characteristics comprise a type of the one or more sensors, a resolution of the one or more sensors, or a sampling rate of the one or more sensors; and
   determining a set of the attributes based in part on a similarity of the one or more characteristics between the target sensor and the one or more sensors not including the target sensor, wherein the comparison of the estimated semantic state to the one or more semantic states is based in part on the set of attributes.

18. A computing system comprising:
   one or more processors;
   one or more non-transitory computer-readable media storing instructions that when executed by the one or more processors cause the one or more processors to perform operations comprising:
      receiving sensor data based in part on one or more sensor outputs from one or more sensors including a target sensor, wherein the sensor data comprises information associated with one or more states of one or more areas detected by the one or more sensors;
      generating, based in part on the sensor data, an estimated semantic state of an area of the one or more areas from the target sensor;
      determining, based in part on a comparison of the estimated semantic state to one or more semantic states of the area from the one or more sensors not including the target sensor, an uncertainty level associated with an accuracy of the estimated semantic state; and
      responsive to the uncertainty level satisfying one or more update criteria, obtaining an updated version of the sensor data from the target sensor.

19. The computing system of claim 18, wherein the estimated semantic state and the one or more semantic states comprise a set of attributes associated with the one or more states of the area from the target sensor and the one or more sensors not including the target sensor respectively.

20. The computing system of claim 19, further comprising:
   determining one or more characteristics of the one or more sensors, wherein the one or more characteristics comprise a type of the one or more sensors, a resolution of the one or more sensors, or a sampling rate of the one or more sensors; and
   determining a set of the attributes based in part on a similarity of the one or more characteristics between the target sensor and the one or more sensors not including the target sensor, wherein the comparison of the estimated semantic state to the one or more semantic states is based in part on the set of attributes.

* * * * *